US012587681B2

(12) United States Patent
Poularakis et al.

(10) Patent No.: US 12,587,681 B2
(45) Date of Patent: Mar. 24, 2026

(54) POINT CLOUD DATA FRAMES COMPRESSION

(71) Applicant: V-NOVA INTERNATIONAL LIMITED, London (GB)

(72) Inventors: Stergios Poularakis, London (GB); Christian Eyles, London (GB)

(73) Assignee: V-NOVA INTERNATIONAL LIMITED, London (GB)

( * ) Notice: Subject to any disclaimer, the term of this patent is extended or adjusted under 35 U.S.C. 154(b) by 0 days.

(21) Appl. No.: 18/693,877

(22) PCT Filed: Sep. 22, 2022

(86) PCT No.: PCT/GB2022/052406
§ 371 (c)(1),
(2) Date: Mar. 20, 2024

(87) PCT Pub. No.: WO2023/047119
PCT Pub. Date: Mar. 30, 2023

(65) Prior Publication Data
US 2024/0397091 A1 Nov. 28, 2024

(30) Foreign Application Priority Data
Sep. 23, 2021 (EP) ..................................... 21386059

(51) Int. Cl.
*H04N 19/597* (2014.01)
*H04N 19/107* (2014.01)
(Continued)

(52) U.S. Cl.
CPC ......... *H04N 19/597* (2014.11); *H04N 19/107* (2014.11); *H04N 19/13* (2014.11);
(Continued)

(58) Field of Classification Search
CPC .... H04N 19/597; H04N 19/107; H04N 19/13; H04N 19/136; H04N 19/172;
(Continued)

(56) References Cited

U.S. PATENT DOCUMENTS

| | | | | | |
|---|---|---|---|---|---|
| 2007/0150810 A1* | 6/2007 | Katz | ..................... | G06F 3/0485 | |
| | | | | 715/229 | |
| 2020/0021856 A1 | 1/2020 | Tourapis et al. | | | |

(Continued)

FOREIGN PATENT DOCUMENTS

| | | | | |
|---|---|---|---|---|
| WO | WO-2019111010 A1 * | 6/2019 | ............. | G06F 17/16 |
| WO | 2021/062279 A1 | 4/2021 | | |

OTHER PUBLICATIONS

Ramasubramonian et al. ("[G-PCC][New proposal] Inter prediction with predictive geometry coding", m56117, Jan. 6, 2021). (Year: 2021).*

(Continued)

*Primary Examiner* — Matthew K Kwan
(74) *Attorney, Agent, or Firm* — Workman Nydegger

(57) ABSTRACT

A method for encoding a frame of a sequence of frames of point cloud data for rendering a dynamic 3D scene, wherein each frame comprises a plurality of points, and each point comprises a 3D position and one or more attributes, the method comprising: obtaining a current point to be encoded in a current frame; identifying a preceding point encoded in a preceding frame which corresponds to the current point to be encoded in the current frame; encoding at least one attribute of the current point by reference to the preceding point using inter-frame predictive encoding to generate encoded data for the current point; and generating the current frame comprising the encoded data for the current point.

20 Claims, 7 Drawing Sheets

(51) Int. Cl.

| | |
|---|---|
| *H04N 19/13* | (2014.01) |
| *H04N 19/136* | (2014.01) |
| *H04N 19/172* | (2014.01) |
| *H04N 19/503* | (2014.01) |
| *H04N 19/593* | (2014.01) |
| *H04N 19/93* | (2014.01) |
| *H04N 19/96* | (2014.01) |

(52) U.S. Cl.

CPC ......... *H04N 19/136* (2014.11); *H04N 19/172* (2014.11); *H04N 19/503* (2014.11); *H04N 19/593* (2014.11); *H04N 19/93* (2014.11); *H04N 19/96* (2014.11)

(58) Field of Classification Search

CPC .... H04N 19/503; H04N 19/593; H04N 19/93; H04N 19/96; H04N 19/54; G06T 9/004; G06T 9/001

USPC ..................................................... 375/240.12

See application file for complete search history.

(56) References Cited

U.S. PATENT DOCUMENTS

| | | | |
|---|---|---|---|
| 2020/0304823 A1* | 9/2020 | Yea ......................... | G06T 9/001 |
| 2020/0374537 A1 | 11/2020 | Makeev | |
| 2022/0114762 A1* | 4/2022 | Kwon ..................... | G06T 9/004 |

OTHER PUBLICATIONS

International Search Report for application No. PCT/GB2022/052406 dated Mar. 30, 2023.

Written Opinion of the International Searching Authority for application No. PCT/GB2022/052406 dated Mar. 30, 2023.

"G-PCC codec description", No. n20351, Jul. 6, 2021 (Jul. 6, 2021), 134. MPEG Meeting; Apr. 26, 2021-Apr. 30, 2021; Online; (Motion Picture Expert Group or ISO/IEC JTC1/SC29/WG11), Retrieved from the Internet: URL:https://dms.mpeg.expert/doc_end_user/documents/134_OnLine/wg11/MDS20351_WG07_N00099.zip N00099.docx XP030297508.

Ramasubramonian (QUALCOMM) A K et al, "[G-PCC][New proposal] Inter prediction with predictive geometry coding", No. {0} m56117, Jan. 6, 2021 (Jan. 6, 2021), 133. MPEG Meeting; Jan. 11, 2021-Jan. 15, 2021; Online; (Motion Picture Expert Group or ISO/IEC JTC1/SC29/WG11), Retrieved from the Internet: URL:https://dms.mpeg.expert/doc_end_user/documents/133_OnLine/wg11/m56117-v1-m56117-v1.zip m56117-v1.docx XP030291079.

European Search Report and Search Opinion received for European Application No. 21386059.6, malled on Mar. 15, 2022, 8 pages.

International Preliminary Report on Patentability received for PCT Patent Application No. PCT/GB2022/052406, mailed on Apr. 4, 2024, 8 pages.

International Search Report and Written Opinion received for PCT Patent Application No. PCT/GB2022/052406, mailed on Jan. 16, 2023, 10 pages.

Office Action received for European Patent Application No. 21386059. 6, mailed on Jul. 8, 2025, 5 pages.

Office Action received for Indian Patent Application No. 202417027427, mailed on Oct. 6, 2025, 11 pages.

* cited by examiner

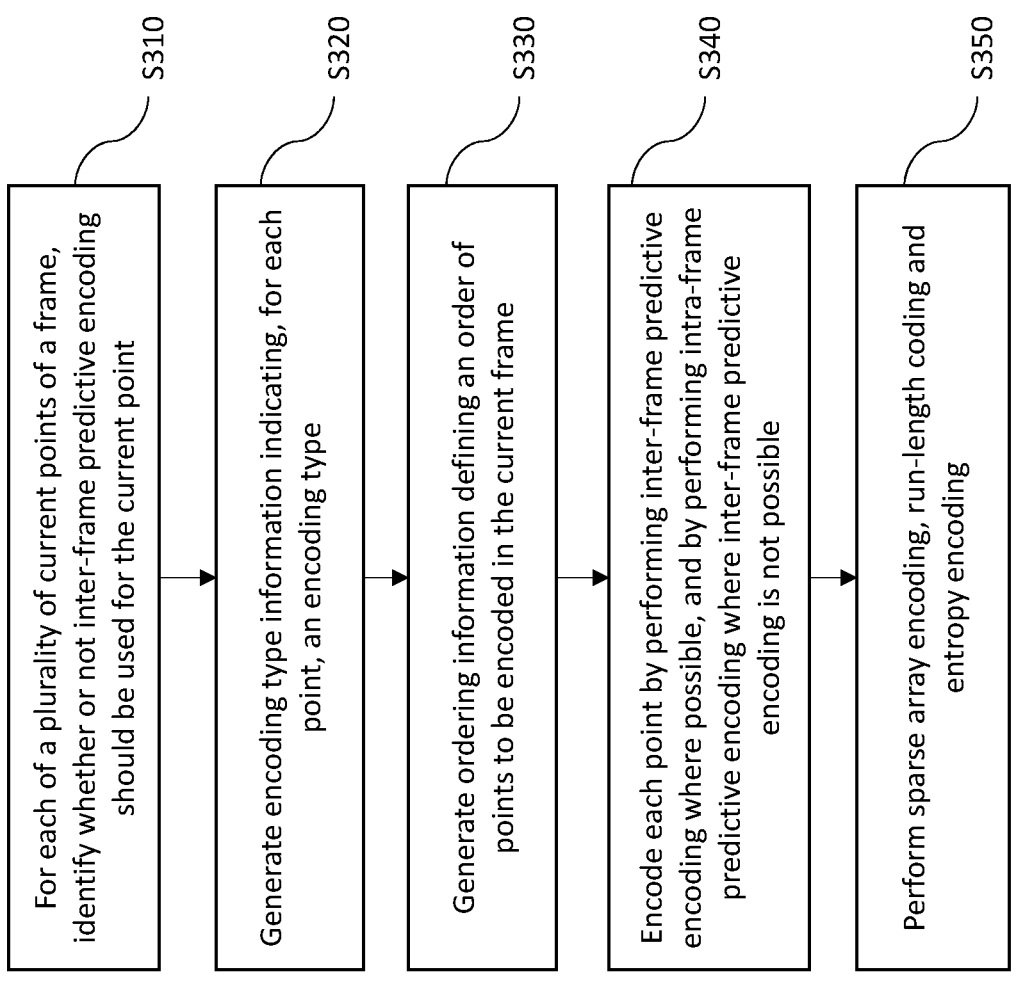

S310

For each of a plurality of current points of a frame, identify whether or not inter-frame predictive encoding should be used for the current point

S320

Generate encoding type information indicating, for each point, an encoding type

S330

Generate ordering information defining an order of points to be encoded in the current frame

S340

Encode each point by performing inter-frame predictive encoding where possible, and by performing intra-frame predictive encoding where inter-frame predictive encoding is not possible

S350

Perform sparse array encoding, run-length coding and entropy encoding

Obtain a current point to be decoded in a current frame

S620

Identify a preceding point decoded in a preceding frame which corresponds to the current point

S630

Decode an attribute of the current point by reference to the preceding point using inter-frame predictive decoding to generate decoded data for the current point

POINT CLOUD DATA FRAMES COMPRESSION

CROSS-REFERENCE TO RELATED APPLICATIONS

This application is a 371 US Nationalization of International Application No. PCT/GB2022/052406, filed Sep. 22, 2022, which claims priority from GB Patent Application No: 21386059.6, filed Sep. 23, 2021, the disclosures of which are hereby incorporated herein by reference in their entirety.

TECHNICAL FIELD

The present disclosure relates to methods for encoding and decoding a frame of a sequence of frames of point cloud data for rendering a 3D dynamic scene. The disclosure also relates to apparatuses and computer programs implementing such methods. Furthermore, the disclosure relates to a frame structure for an encoded frame.

BACKGROUND

Point cloud data is increasingly used for representing 3D scenes, for example in virtual reality or augmented reality applications. In such applications, point cloud data is stored on, or communicated to, a display device such as a screen or a near-eye display, and rendered to display the 3D scene.

In such 3D scenes, a large number of points may be used to represent different objects or object surfaces within the scene. Each point typically has a 3D position and one or more attributes, where the attributes may include, for example, a surface colour, a transparency value, an object size and a surface normal direction. Each attribute may have a value chosen from a continuous range or may have a value chosen from a discrete set.

In a dynamic 3D scene, each point may change its 3D position and any of its attributes. A sequence of instances of the 3D scene is represented as a sequence of frames, and the sequence of frames may be rendered to reconstruct the dynamic 3D scene, including changes in the 3D position and attributes of each point, and including addition or removal of points. The sequence of frames often represents an equal-interval time sequence (e.g. a certain regular rate of frames per second). However, frames of a sequence can be separated by unequal time intervals, or may not be linked to a time sequence at all, for example when the sequence is intended to be manually stepped-through.

One particular application of point cloud data is for volumetric video. In volumetric video, techniques such as motion capture are used to obtain point cloud data, as a 3D recording of a real-world scene, or a real-world scene mixed with computer generated elements. In volumetric video, the density of points in the point cloud may typically be high enough to accurately reproduce human motion or human facial expressions.

Uncompressed point cloud data formats include a complete definition of each point in each frame. This can require a large amount of data storage, and can mean that live rendering or streaming of a dynamic 3D scene is not possible. Accordingly, it is desirable to provide an efficient compressed format for point cloud data.

One known geometry-based point cloud compression technique uses a logical structure such as an octree to efficiently describe a sparse set of points in a 3D space in a single instant. This logical structure is further used for predictive encoding of attributes between relatively nearby points (i.e. intra-frame predictive encoding), as described in GRAZIOSI et al. "An overview of ongoing point cloud compression standardization activities: video-based (V-PCC) and geometry-based (G-PCC)", DOI: 10.1017/ATSIP.2020.12

Another known geometry-based point cloud compression technique uses motion vectors to represent movement of textures or objects in consecutive frames, as described in ROODAKI et al: "G-Arrays: Geometric arrays for efficient point cloud processing", DOI: 10.1109/ICASSP39728.2021.9413902

SUMMARY

The present disclosure provides encoding and decoding techniques for point cloud data with increased compression efficiency.

More specifically, according to a first aspect, the present invention provides a method for encoding a frame of a sequence of frames of point cloud data for rendering a dynamic 3D scene, wherein each frame comprises a plurality of points, and each point comprises a 3D position and one or more attributes, the method comprising: obtaining a current point to be encoded in a current frame; identifying a preceding point encoded in a preceding frame which corresponds to the current point to be encoded in the current frame; and encoding at least one attribute of the current point by reference to the preceding point using inter-frame predictive encoding to generate encoded data for the current point.

Herein, "inter-frame predictive encoding" means encoding a difference between a property in one frame and the same property in another frame. For example, inter-frame predictive encoding of an attribute of a current point to be encoded in a current frame means encoding a difference between the value of that attribute for the current point of the current frame and the value of that attribute for a preceding point encoded in a preceding frame.

In the features of the first aspect, "current" and "preceding" labels are used to identify which instant of the dynamic 3D scene is represented in the corresponding point or frame. Herein "preceding" does not necessarily mean "immediately preceding", and the "preceding frame" can refer to a different preceding frame for each point, depending on how long (i.e. for how many frames) the individual point remains suitable for inter-frame predictive encoding.

The features of the first aspect have the effect of providing inter-frame prediction for point cloud data for attributes other than position, thereby enabling improved compression efficiency for cases in which a point undergoes changes in attributes such as lighting and colour during the course of a dynamic scene.

The method may further comprise generating the current frame comprising the encoded data for the current point. The step of "generating the current frame" may simply comprise recording the encoded data for the current point in a memory or transmitting the encoded data for the current point to a separate device. The current frame may be transmitted as a stream as it is generated, wherein each current point has encoded data transmitted separately. Alternatively, an entire current frame having the plurality of its points may be encoded before the entire frame is recorded in a memory or transmitted from an encoder to a separate device.

Optionally, identifying the preceding point which corresponds to the current point comprises identifying a preceding point encoded in the preceding frame which has a same 3D position as the current point. This provides a way to select points suitable for inter-frame prediction of attributes. In this application, "same 3D position" means a 3D position which is similar to within a predetermined level of accuracy, where the predetermined level of accuracy may be a relative or absolute level chosen according to a specific use case for the method. For example, a characteristic distance between points may be determined based on the total volume of the 3D scene and the number of points in the scene, or based on a minimum distance between points in the preceding frame. If the displacement between the preceding point and the current point is much smaller than the characteristic distance, then it may be acceptable to assume that the preceding point corresponds to the current point. On the other hand, if a 3D scene is expected to regularly show points appearing and disappearing between consecutive frames, then it may be necessary to define "same position" as an identical position.

Optionally, the one or more attributes of each point comprises a non-predicted attribute; and identifying the preceding point which corresponds to the current point comprises identifying a preceding point encoded in the preceding frame which has a same 3D position as the current point and has a same value of the non-predicted attribute as the current point. This provides a further refinement of how to select points suitable for inter-frame prediction of attributes, by using inter-frame prediction in cases where not only the 3D position of a point but also another "non-predicted" attribute such as surface orientation is the same as in the previous frame. Any attribute may be non-predicted. For example, an attribute may be chosen to be "non-predicted" if the attribute is unsuitable for prediction between frames, or if the attribute is particularly vulnerable to compression-related errors. In this application, "same value of the non-predicted attribute" means a value which is similar to within a predetermined level of accuracy. Furthermore, in the method, the one or more attributes of each point may comprise a plurality of non-predicted attributes. Optionally, a different level of accuracy may be predetermined for each non-predicted attribute.

Optionally, the method comprises: obtaining a first portion of the plurality of current points to be encoded in the current frame; for each current point of the first portion, identifying whether or not inter-frame predictive encoding can be used for the current point, wherein inter-frame predictive encoding can be used if there is a preceding point encoded in the preceding frame which corresponds to the current point to be encoded in the current frame; and encoding the frame by performing inter-frame predictive encoding on each current point for which inter-frame predictive encoding can be used and by performing intra-frame predictive encoding on each current point for which inter-frame predictive encoding cannot be used. Herein, intra-frame predictive encoding should be understood to mean "attempted intra-frame encoding", and that some "intra-frame predictive encoded points" may not actually be modified during encoding, if there is no relevant reference within the points of the frame.

Optionally, the method further comprises generating encoding type information indicating, for each point of the current frame, an encoding type, wherein the type is inter-frame predictive encoding or intra-frame predictive encoding. The encoding type information identifies which points are partly defined by a previous frame or frames, helping a decoder to render the compressed point cloud data. The encoding type information may be included when generating the current frame for recording or transmission.

Optionally, in a first particular type of embodiment, the method further comprises generating ordering information defining an order of a second portion of the plurality of current points to be encoded in the current frame, wherein the current frame is generated comprising the ordering information and comprising encoded data ordered according to the ordering information. The second portion may be chosen independently from the first portion and the first and second portions may partially or fully overlap with each other. For example, the points of the second portion may be a subset of the points of the first portion which are to be intra-frame predictively encoded. In another example, the ordering information may indicate a complete order for all points.

Optionally, in the first particular type of embodiment, the ordering information comprises the 3D position of each point of the current frame. The 3D position may be defined within an overall space containing the entire 3D scene, or may be a position within a smaller local space, such as a node of an octree dividing the overall space.

Optionally, in the first particular type of embodiment, the ordering information comprises an octree based on the 3D position of each point of the current frame. In an octree, a volume is recursively split into 8 sub-volumes along the X-, Y- and Z-axes, to create a tree look-up for the points associated with each node of the octree. An octree has the advantage of reducing the amount of data required to define the position of each point.

Optionally, in the first particular type of embodiment, each leaf node of the octree comprises at least one 3D position of a point of the current frame. In other words, while the volume is being recursively split into sub-volumes, any sub-volumes which do not contain any points are not split any further and are omitted when storing the octree in memory. This "pruning" of unnecessary branches of the octree reduces the size of the compressed data, and reduces the time to read, decode and render the compressed data.

Optionally, in the first particular type of embodiment, the points of the current frame are ordered by first, second and third dimensions of the 3D position of each point. This provides an alternative default way to sort points, and may be combined with an octree. For example, the octree may divide an overall space up to 3 levels, reducing the volume per octree node to 1/512 of the overall space. If any octree node is still associated with multiple points located near to each other within the overall space, the multiple points may be ordered by the three dimensions of the 3D position of the points.

Optionally, in a second particular type of embodiment which may be combined with the first particular type of embodiment, the method further comprises: encoding a third portion of the plurality of current points of the current frame using intra-frame predictive encoding. Although the third portion is defined to be independent of the first and second portions of the plurality of current points, the third portion may in many cases be the same as the second portion.

Optionally, in the second particular type of embodiment, the method comprises: intra-frame predictive encoding a first attribute of the one or more attributes, wherein intra-frame predictive encoding the first attribute comprises: obtaining an average of the first attribute for the plurality of current points; and obtaining, for each of the plurality of current points, a difference between the average and a value of the first attribute for the current point. This average-and-difference technique can reduce the required quantity of bits to represent the plurality of current points. The average-and-difference technique may equally be applied for inter-frame predictive encoding.

Optionally, in the second particular type of embodiment, the plurality of current points are a local group of points corresponding to a node at a predetermined level of an octree.

Optionally, in the second particular type of embodiment, the method comprises intra-frame predictive encoding a second attribute of the one or more attributes, wherein intra-frame predictive encoding the second attribute comprises: obtaining a raw value of the second attribute for a first current point; and obtaining an encoded value of the second attribute for a second current point, wherein the encoded value is equal to the difference between the raw values of the second attribute for the second current point and for the first current point.

Optionally, the method comprises: predictive encoding a third attribute of the one or more attributes for each of a fourth portion of the plurality of current points of the frame; performing sparse array compression on the encoded values of the third attribute for the fourth portion of the plurality of current points, wherein sparse array compression comprises: splitting the encoded values of the third attribute into groups of a predetermined size N; and generating a sparsity array identifying whether or not each group comprises only encoded values smaller than or equal to a predetermined threshold and generating the current frame comprising the sparsity array and the groups containing at least one encoded value greater than the predetermined threshold. By eliminating groups which are zero or near zero, compression is further improved. Here, the fourth portion is independent from the first, second and third portions, and should be regarded as independent. This optional feature is equally applicable to intra-frame predictive encoding and inter-frame predictive encoding. The "predetermined threshold" is zero for attributes which cannot be reasonably decoded with losses. For example, the predetermined threshold for a colour attribute could be greater than zero in cases where this does not noticeably affect the rendering of the 3D scene, but would need to be zero for other examples of attributes such as an attribute indicating one of a discrete set of possible lighting positions.

Optionally, the method further comprises performing run-length encoding on the sparsity array. Run-length encoding can further improve compression, Optionally, the method further comprises applying entropy encoding, such as VC-6 encoding, to at least one of ordering information, encoding type information, and encoded values of a fourth attribute of the current frame. Entropy encoding can further improve compression. VC-6 has been described in PCT/GB2018/053552, and the associated standard specification documents including the ST 2117-1:2020-SMPTE Standard-VC-6 Multiplanar Picture Format-Part 1 Elementary Bitstream published on 21 Jul. 2020 (DOI 10.5594/SMPTE.ST2117-1.2020 and Electronic ISBN: 978-1-68303-219-9), all of these documents being incorporated by reference herein in their entirety.

Optionally, the entropy encoding method is a Huffman encoding, a range encoding, or a method according to the VC-6 standard.

According to a second aspect of the present disclosure, there is provided a method for decoding a frame of a sequence of frames of point cloud data for rendering a dynamic 3D scene, wherein each frame comprises a plurality of points, and each point comprises a 3D position and one or more attributes, the method comprising: obtaining a current point to be decoded in a current frame;

identifying a preceding point decoded in a preceding frame which corresponds to the current point to be decoded in the current frame; decoding at least one attribute of the current point by reference to the preceding point using inter-frame prediction to generate decoded data for the current point. This method of decoding corresponds to the method of encoding of the first aspect, and the optional features of the first aspect may also be optionally included in implementations of the second aspect to provide decoding equivalent to the corresponding encoding described above.

More specifically, optionally, identifying the preceding point which corresponds to the current point comprises identifying a preceding point decoded in the preceding frame which has a same 3D position as the current point.

Additionally, optionally, the one or more attributes of each point comprises a non-predicted attribute; and identifying the preceding point which corresponds to the current point comprises identifying a preceding point decoded in the preceding frame which has a same 3D position as the current point and has a same value of the non-predicted attribute as the current point.

Additionally, optionally, the method for decoding a frame comprises: obtaining a first portion of the plurality of current points to be decoded in the current frame;

for each current point of the first portion, identifying whether or not inter-frame predictive encoding was used for the current point, wherein inter-frame predictive encoding can be used if there is a preceding point encoded in the preceding frame which corresponds to the current point to be encoded in the current frame; and decoding the frame by performing inter-frame predictive decoding on each current point for which inter-frame predictive decoding can be used and by performing intra-frame predictive decoding on each current point for which inter-frame predictive decoding cannot be used.

Additionally, optionally, the current frame comprises encoding type information indicating, for each point of the current frame, an encoding type, wherein the type is inter-frame predictive encoding or intra-frame predictive encoding.

Additionally, optionally for the second aspect, the method may further comprise decoding ordering information defining an order of a second portion of the plurality of current points which are encoded in the current frame.

Additionally, optionally for the second aspect, the method may further comprise decoding a third portion of the plurality of current points of the current frame using intra-frame predictive decoding.

Where the method according to the second aspect comprises decoding the third portion using intra-frame predictive decoding, the method may further comprise predictive decoding a first attribute of the one or more attributes, wherein intra-frame predictive decoding the first attribute comprises, for each of the plurality of current points: adding an average of the first attribute for the plurality of current points to a difference between the average and a value of the first attribute for the current point.

Additionally or alternatively according to the second aspect, the plurality of current points may be a local group of points corresponding to a node at a predetermined level of an octree.

Optionally according to the second aspect, the method comprises intra-frame predictive decoding a second attribute of the one or more attributes, wherein intra-frame predictive decoding the second attribute comprises: obtaining a raw value of the second attribute for a first current point; and obtaining an decoded value of the second attribute for a second current point, wherein the decoded value is equal to the sum of the encoded value of the second attribute for the second current point and for the raw value of the second attribute for the first current point.

Optionally, according to the second aspect, the method further comprises reversing a sparse array compression on the encoded values of a third attribute for each of a fourth portion of the plurality of current points of the frame, wherein reversing sparse array compression comprises: reading a sparsity array of the encoded values to identify groups of encoded values to which sparse array compression was applied on encoding; for each group of encoded values to which sparse array compression was applied; and inserting a group of encoded zero values of a predetermined size N at each position where sparse array compression was applied.

Optionally, according to the second aspect, the method further comprises reversing a run-length encoding.

According to a third aspect, the present disclosure provides an encoder configured to perform an encoding method as described above in the first aspect.

According to a fourth aspect, the present disclosure provides a decoder configured to perform a decoding method as described above in the second aspect.

According to a fifth aspect, the present disclosure provides a computer program comprising instructions which, when executed, perform an encoding method as described above in the first aspect.

According to a sixth aspect, the present disclosure provides a computer program comprising instructions which, when executed, perform a decoding method as described above in the second aspect.

The computer program of the fifth or sixth aspects may be stored as instructions on a non-transitory computer-readable medium or in a signal transmission.

According to a seventh aspect, the present disclosure provides a frame of a sequence of frames of point cloud data for rendering a dynamic 3D scene, wherein each frame comprises a plurality of points, and each point comprises a 3D position and one or more attributes, the frame comprising: encoded data for each point of the frame, wherein the encoded data for at least one point is encoded by inter-frame predictive encoding.

The frame of the seventh aspect may be generated according to a method of the first aspect.

Although the above aspects recite techniques applied to point cloud data, the techniques described in this specification are fairly generally applicable to any data in the form of a sequence of frames, wherein each frame comprises a plurality of data elements, and each data element comprises a 2D or 3D position and one or more attributes. For example, the described techniques could be applied to volumetric video recorded as mesh data rather than point cloud data.

BRIEF DESCRIPTION OF THE DRAWINGS

FIG. 3 is a flow chart schematically illustrating a method for encoding a frame of a sequence of frames of point cloud data;

DETAILED DESCRIPTION

Figure 1:
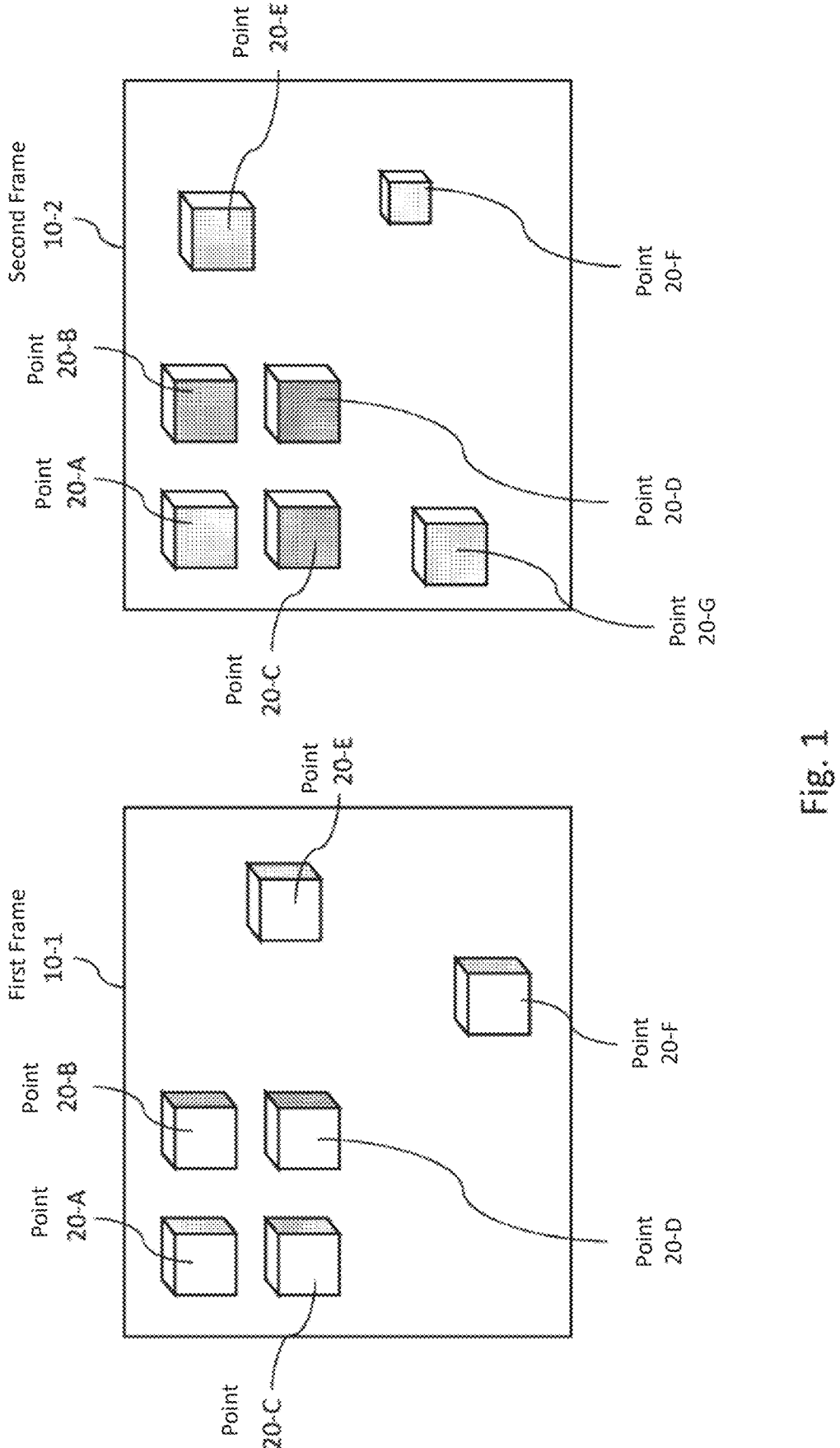
FIG. 1 is a schematic example of a sequence of frames of point cloud data for rendering a dynamic 3D scene.

FIG. 1 gives a schematic, greatly simplified, example of the kind of point cloud data to which the described techniques may be applied. More specifically, FIG. 1 schematically shows a sequence of frames of point cloud data for rendering a dynamic 3D scene.

The sequence of frames in FIG. 1 comprises only two frames. While it is in principle possible to apply the described techniques to just two frames, the described techniques offer greater compression efficiency for longer sequences of frames.

Referring to FIG. 1, the sequence of frames comprises a first frame 10-1 and a second frame 10-2.

In the first frame 10-1, the 3D scene comprises six points 20-A to 20-F, each arranged at a respective 3D position in a volume of the scene.

In this simple example, the six points 20-A to 20-F are separate solid objects, more specifically cubes. More generally, a group of points of the 3D scene can be associated with different surfaces of a single solid object, or can be associated with different objects appearing in the scene.

Each of the six points 20-A to 20-F displays several attributes which could be included in a sequence of frames representing the scene. Each cube has a size and a colour. The colour here is represented by a greyscale shaded side of the cube, where darker shading can be taken to mean a darker colour. Additionally, the shaded side of each cube indicates the position of a light source pointing at the opposite side of the cube. More generally, the attributes may include any property of a point cloud 3D scene which is required to appear when the point cloud data is rendered for a viewer.

In the second frame 10-2, the 3D scene has changed. The scene now comprises seven points 20-A to 20-G. The 3D positions of points 20-E and 20-F have changed, while the point 20-G is newly added. Additionally, the light source has moved such that the opposing shaded part of each object is on the "front" surface as displayed in the figure. Furthermore, the size of point 20-F has reduced.

Figure 2:
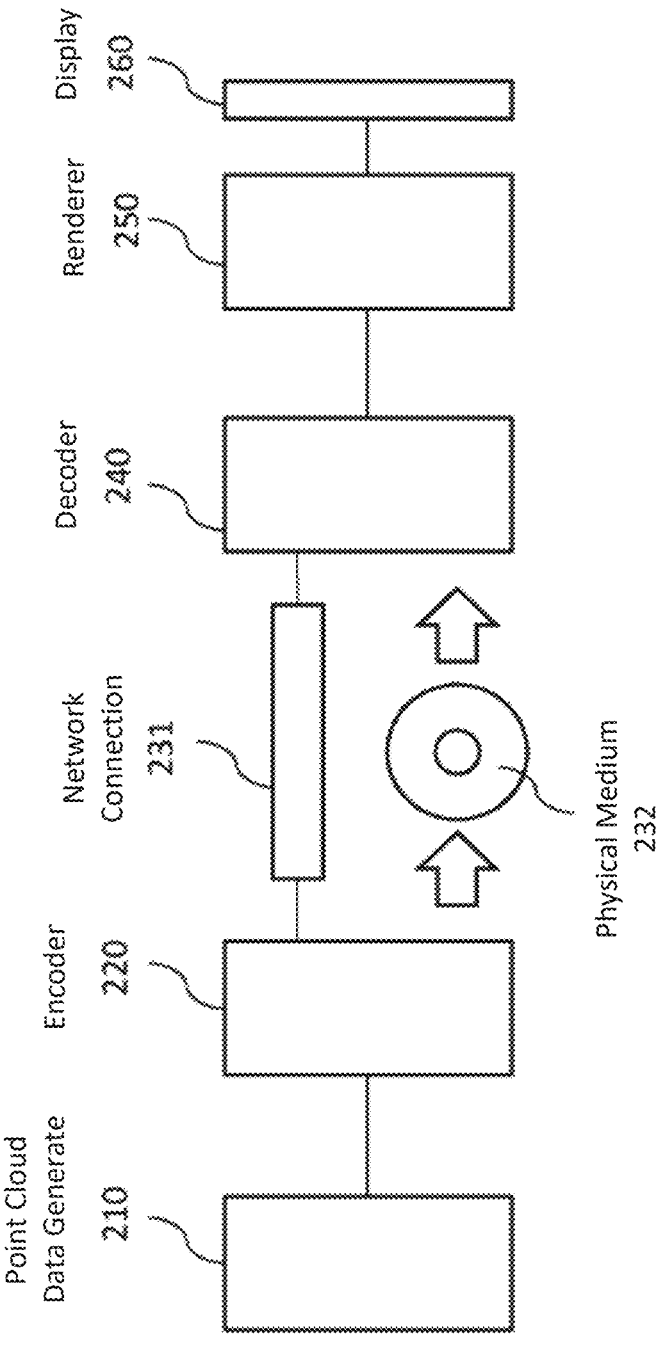
FIG. 2 is a schematic block diagram of a point cloud data communication system.

FIG. 2 is a schematic block diagram of a point cloud data communication system which may use the following computer-implemented methods provided by this specification.

Referring to FIG. 2, the system comprises a point cloud data generator 210, an encoder 220, a decoder 240, a renderer 250 and a display 260.

The point cloud data generator 210 may be any known system for generating point cloud data in the format of a sequence of frames, wherein each frame comprises a plurality of points, and each point comprises a 3D position and one or more attributes. For example, the point cloud data generator 210 may generate a sequence of frames as shown in FIG. 1.

The sequence of frames is sent to an encoder 220 which performs a method of encoding a frame (and usually multiple frames) of the sequence of frames.

The encoded sequence of frames is compressed by the encoding, so that the encoded sequence can be transmitted over a network connection 231, and/or stored on a physical medium 232 (such as a DVD, flash drive or server). The network connection 231 and physical medium 232 may comprise any content-independent mode of data communication.

Eventually, when a user wishes to see the dynamic 3D scene, the encoded sequence of frames is provided to a decoder 240, via the network connection 231 or the physical medium 232.

The decoder 240 performs a method of decoding a frame (and usually multiple frames) of the sequence of frames.

The decoded frame(s) are then passed to a renderer 250 to render the dynamic 3D scene for display on the display 260. The renderer 250 and display 260 can be any renderer and display currently in use for point cloud data, where the renderer 250 is configured to receive point cloud data in the format of a sequence of frames, wherein each frame comprises a plurality of points, and each point comprises a 3D position and one or more attributes.

As can be understood from FIG. 2 and the above description, the invention primarily relates to an encoding and decoding method, encoders and decoders configured to perform the methods, and the encoded data created by the encoding method and used by the decoding method. On the other hand, the initial point cloud data received by the encoder and reproduced by the decoder can be conventional point cloud data. Accordingly, the generator 210 and renderer 250 are not described in detail.

Figure 4:
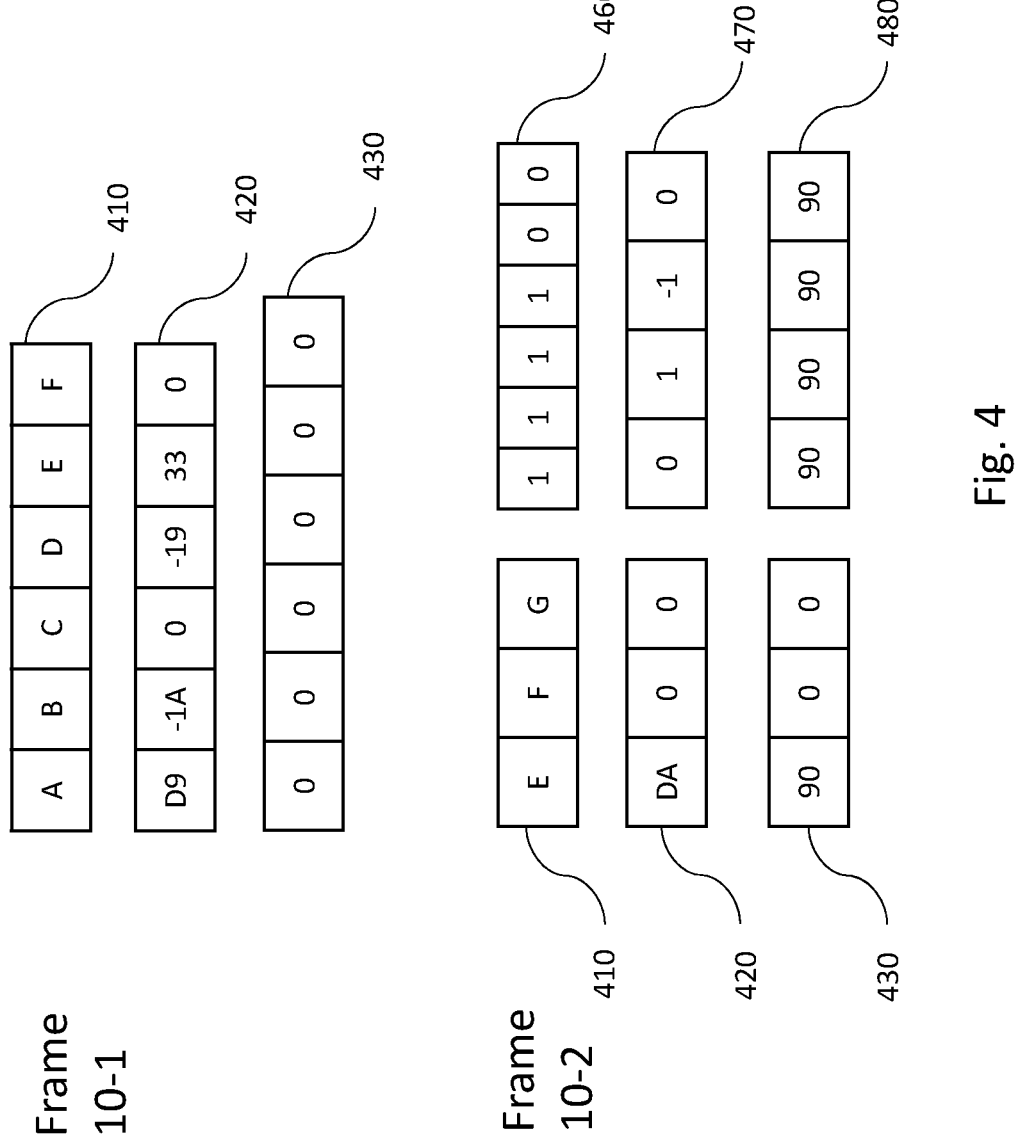
FIG. 4 is a schematic diagram of a sequence of encoded frames.

FIG. 3 is a flow chart schematically illustrating a method for encoding a frame of a sequence of frames of point cloud data. FIG. 4 is a schematic diagram of a sequence of encoded frames. It is useful to switch between FIGS. 3 and 4 to explain the encoding method as applied to the sequence of frames in FIG. 1.

Referring to FIG. 3, a key concept of the encoding method disclosed herein is the distinguishing between some point cloud points which should be predicted using inter-frame predictive encoding and other point cloud points which are more preferably predicted using intra-frame predictive encoding.

There are various reasons for choosing between inter-frame and intra-frame encoding.

For example, inter-frame encoding of a moving point can be quite resource intensive because it is necessary to be sure which points in successive frames are actually the same point. As a result, the inventors have found it preferable to perform inter-frame encoding only for point cloud points which are stationary at and before the current frame.

On the other hand, changes in lighting and colour are quite common in dynamic 3D scenes, and can affect a large number of points while being relatively easy to track between frames. As a result, the inventors have found it preferable to perform inter-frame encoding for colour attributes.

Looking more specifically at FIG. 3, at step S310, the encoder 220 assesses the points of the current frame to be encoded and identifies which type of encoding should be used for each point. In other words, step S310 comprises, for each of a plurality of current points of a frame, identifying whether or not inter-frame predictive encoding should be used for the current point.

For example, the encoder 220 may be configured to compare the current frame to a preceding frame and determine whether each point of the current frame was present in the preceding frame.

In this case, if the preceding frame has a preceding point at a same position as a point of the current frame, the encoder 220 determines that it should perform inter-frame predictive encoding on the current point of the current frame by reference to the preceding point to generate encoded data for the current point in the current frame.

In an alternative example, the encoder 220 may have more strict requirements for identifying a preceding point in the preceding frame as corresponding to the current point of the current frame. For example, the encoder 220 may require not only that the current point and preceding point have the same 3D position, but also that they have one or more other attributes in common, such as a same size or a same surface orientation. Such additional required attributes may be designated as "fixed attributes" or "non-predicted attributes" in a given application of the encoding.

This alternative example otherwise works similarly, and if the strict requirements are met, the encoder 220 similarly determines that it should perform inter-frame predictive encoding on the current point of the current frame by reference to the preceding point to generate encoded data for the current point in the current frame.

If the encoder 220 does not identify a preceding point encoded in the preceding frame that corresponds to a current point of the current frame, then the encoder 220 determines that it should either encode the current point with intra-frame predictive encoding, or omit predictive encoding entirely for that point. For the purposes of this description, it is assumed that the absence of predictive encoding is a special case of intra-frame predictive encoding.

Applying step S310 to the sequence of frames in FIG. 1, the encoder 220 would treat the second frame 10-2 as the current frame, and the first frame 10-1 as the preceding frame.

In view of the requirement that there must be a preceding point corresponding to the current point, the encoder 220 would determine that points 20-A to 20-D should be encoded using inter-frame predictive encoding, and that points 20-E to 20-G should be encoded using intra-frame predictive encoding.

At step S320, the encoder generates encoding type information indicating, for each point, an encoding type. Referring to FIG. 4, the encoding type information 460 of frame 10-2 may comprise one bit per point cloud point of the current frame 10-2. In fact, the encoding type information can more efficiently omit any points which did not exist in the preceding frame, since these cannot be inter-frame predictively encoded, regardless of relaxing any rules. As a result, the bit array 460 comprises only 6 bits for the 6 points 20-A to 20-F which appeared in the preceding frame (first frame 10-1).

As explained above, it is only points 20-A to 20-D which should be inter-frame predictively encoded, when applying step S310 to the example of FIG. 1. Accordingly, as shown in FIG. 4, the encoding type information 460 of frame 10-2 has four ones (indicating that points 20-A to 20-D will be inter-frame predictively encoded) and two zeroes (indicating that points 20-E and 20-F will be intra-frame predictively encoded).

At step S330, the encoder 220 generates ordering information 410 defining an order of points to be encoded in the current frame. This ordering information 410 is included once, so that additional information about each point can be collected in layers by attribute, without having to identify the point again in each layer. This identification would otherwise add complexity both to the amount of memory required to store the encoded data and also to the process for encoding and decoding.

The ordering information 410 can most efficiently be restricted to omit points which will be inter-frame predictively encoded. This is because inter-frame predictively encoded points necessarily already had an order as defined in the preceding frame. The preceding frame will also be available to the decoder, and therefore including the ordering of the inter-frame predictively encoded points is redundant. Thus, as shown in the specific example of FIG. 4, the encoded frame 10-2 can simply have ordering information 410 regarding the intra-frame predictively encoded points 20-E, 20-F and 20-G.

It is of course also necessary to identify a format for the ordering information and a way of choosing the order.

The simplest way if ordering the points may be an XYZ sort. More specifically, each point is associated with a 3D position which can be defined numerically in Cartesian dimensions. An order to the dimensions can be arbitrarily chosen in order to sort the points into a single list based on their numerical 3D position.

A single list, however, may not always be the most efficient strategy. In particular, that is not the fastest way to compare two frames to identify points which appear in both frames (as required in step S310).

As a solution, octrees are known for structured storing of 3D points, and provide efficient look-up of points in a 3D space. In an octree, a volume is recursively split in two along the X-, Y- and Z-axes to give 8 sub-volumes. The volumes and sub-volumes can be traversed in a tree structure, to look-up for the points associated with each node of the octree, i.e. each volume and sub-volume.

Nevertheless, at a low level in the octree structure, the number of points per tree node can become small, at which point it can be more efficient to stop the recursive splitting and to just use a single list. For this Cartesian sort, either globally or within octree leaf nodes, the ordering information 410 may comprise an absolute or relative 3D position of each point that is to undergo intra-frame predictive encoding.

In order to store the octree in memory or produce a data stream including the octree, it is necessary to choose a linearising method, such as depth first or breadth first ordering of nodes in the octree. The linearising method can be a predetermined method known to both the encoder 220 and decoder 240 for encoding and reading the octree. Alternatively, the linearising method could be included as a parameter of an individual frame or as a parameter of a sequence of frames.

As a further efficiency improvement for octrees, the octree may stop branching if the number of associated point cloud points becomes low or zero at any level of the octree.

As a simple example, the 3D scene may comprise a 8×8×8 voxel space having points at the following (X,Y,Z) coordinates: (0,0,0), (0,1,1), (3,3,3), and (7,1,1).

These may be formed into an octree which terminates at 2×2×2-size voxels, where each branch node comprises 8 bits indicating which sub-branches or sub-leaf nodes exist in the encoded octree, as sorted by XYZ. On the other hand, each leaf node comprises one or more 3D positions. The tree nodes are ordered breadth-first.

In this example, the ordering information appears as follows, where curly braces denote nodes of the octree and parentheses denote 3D position coordinates:
{10001000}, {1000001}, {00001000}, {2, (0,0,0), (0,1,1)}, {1, (1,1,1)}, {1, (1,1,1)}

This sequence is explained as follows, discussing each node separately:
1. {10001000}
The first node is the root node at level zero of the octree, indicating that the first and fifth subnodes, corresponding to 4×4×4 voxels starting at (0,0,0) and (4,0,0), are occupied by at least one point. Accordingly, the decoder would understand that the encoded octree includes two nodes at level 1 of the octree.
2. {10000001}
The second node is at level 1 of the octree, corresponding to the first voxel indicated in the root node, i.e. the 4×4×4 voxel starting at (0,0,0). The second node indicates that its first and eight subnodes, corresponding to 2×2×2 voxels starting at (0,0,0) and (2,2,2) are occupied by at least one point. Accordingly, the decoder would understand that the encoded octree includes two nodes at level 2 of the octree branching from the second node.
3. {00001000}
The third node is at level 1 of the octree, corresponding to the second voxel indicated in the root node, i.e. 4×4×4 voxel starting at (4,0,0). The second node indicates that its fifth subnode, corresponding to a 2×2×2 voxel starting at (6,0,0) is occupied by at least one point. Accordingly, the decoder would understand that the encoded octree includes one node at level 2 of the octree branching from the third node.
4. {2, (0,0,0), (0,1,1)}
The fourth node is at level 2 of the octree, corresponding to the first voxel indicated at level 1, i.e. the 2×2×2 voxel starting at (0,0,0) indicated in the second node.
Since this octree terminates at 2×2×2-size voxels, the fourth node does not contain 8 bits indicating branching, and instead contains one or more locations of individual points. Specifically, the fourth node indicates that the first point in the point ordering is at (0,0,0) and the second point in the point ordering is at (0,1,1).
In this embodiment, the leaf nodes also include a count of the number of points associated with the leaf node-2 in this case-so that a decoder reading the ordering information can identify the end of bits associated with the fourth node. As an alternative, instead of including a count of points, a terminating symbol could be defined to indicate the end of a leaf node.
5. {1, (1,1,1)}
The fifth node is also at level 2 of the octree, corresponding to the second voxel indicated at level 1, i.e. the 2×2×2 voxel starting at (2,2,2) indicated in the second node.
The fifth node indicates that the third point in the point ordering is at an offset of (1,1,1) from the start (2,2,2), i.e. the third point is at (3,3,3). In other words, this example uses local coordinates within the volume represented by each leaf node of the octree. In other examples, the 3D position may be a global position in the overall volume of the 3D scene.
6. {1, (1,1,1)}
The sixth node is again at level 2 of the octree, corresponding to the third voxel indicated at level 1, i.e. the 2×2×2 voxel starting at (6,0,0) indicated in the third node.
The sixth node indicates that the fourth point in the point ordering is at an offset of (1,1,1) from the start (6,0,0), i.e. the fourth point is at (7,1,1).
In the above example, representing four points using an octree is possibly not efficient. However, the octree becomes more useful with larger numbers of points in the 3D scene, particularly because a tree structure can be traversed in logarithmic time rather than linear time, in order to match points between frames and identify where inter-frame predictive encoding should be used.

Next, at step S340, the encoder 220 encodes each point using the encoding type identified in step S310. In other words, the encoder 220 encodes each point by performing inter-frame predictive encoding where possible, and by performing intra-frame predictive encoding where inter-frame predictive encoding is not possible. Here, "possible" is defined as set out above for step S310, and different requirements for when inter-frame predictive encoding is "possible" may be set in different embodiments.

Step S340 could be done before or simultaneously with steps S320 and S330.

Referring again to FIG. 4, the different types of encoding performed in step S340 can be seen.

Each of the encoded frames 10-1 and 10-2 includes two point attributes: colour and light source direction.

The inter-frame predictively encoded colour data 420 of the first frame 10-1 shows positive and negative hexadecimal values predicting the differences between adjacent ordered point cloud points. For example, D9 in hexadecimal corresponds to 217 in conventional decimal. Hexadecimal is commonly used to represent values in groups of 4 bits (because $2^4$=16), but the way in which data may be represented is not limited in this application. Referring to FIG. 1, points 20-B to 20-D have a darker colour leading to the negative values shown in FIG. 4.

On the other hand, the intra-frame predictively encoded colour data 420 of the second frame 10-2 is comprised largely of zeroes indicating that this data can be efficiently stored using intra-frame prediction.

In this simple example, the intra-frame prediction is specifically performed based on the principle of differential coding, where each encoded value is the difference between attribute values for adjacent points in the ordered sequence of points defined by the ordering information 410.

In examples with more points, it can be useful to perform more statistical methods.

In one example, the average value of an attribute may be obtained for a plurality of points, and the encoded value may be defined as the difference between each point and the average. This can decrease the average number of bits required to represent the differential values, while only creating the minor overhead of the single average value.

That example, can be expanded to local averages and local differentials, so long as it does not create too much overhead for the average values. Local points can, for example, be grouped together based on a node at a predetermined level of an octree used to define the ordering of points.

Finally, the inter-frame predictively encoded colour data 470 is also largely zero because, despite the change in light source direction, the colour of the non-moving bodies is also constant.

Moving on to the light source direction attribute 430, 480, frame 10-1 indicates that the light source is a single direction for all points. This direction changes from 0 to 90 for all points by the time of the second frame 10-2. This is a case where inter-frame predictive encoding (as shown in 480) may be inefficient, because the same change is being encoded multiple times for different points. On the other hand, intra-frame predictive encoding (as shown in 430 for the second frame 10-2) for this example attribute is efficient because the change in light source direction need only be recorded once for all points in the encoded data.

As a generalization of the above, the encoded data can comprise a plurality of different layers associated with different attributes. Each layer can be divided into inter-frame and intra-frame points which can be encoded in different ways. However, it is not necessarily desirable to use as much inter-frame predictive encoding as possible, as this does not always improve compression or encoding/decoding times.

After the predictive encoding has been performed in step S340, the method may also optionally include more general data compression techniques. For example, at step S350, the encoder 220 may perform any of sparse array encoding, run-length encoding and/or entropy encoding.

Sparse array encoding comprises compressing sections of data containing relatively little data. In sparse array coding, a bit sequence of encoded data is split into groups of N bits, where N is predetermined. Each group that contains only zeroes is removed. Additionally, a list of removals is constructed (called a sparsity array). The sparsity array indicates which groups of N bits were removed, so that the groups of zeroes can be reconstructed at the decoder 240.

In a specific example, the data subjected to sparse array encoding is x={4, 0, 3, 0, 0, 0, 0, 0, 0, 0, 1, 3, 5, 0, 0, 0, 0, 0, 0, 0, 0, 0, 0, 0, 0, 3}, and the value of N is 4. The data is split into groups $x_0$={4, 0, 3, 0}, $x_1$={0, 0, 0, 0}, $x_2$={0, 1, 3, 5}, $x_3$={0, 0, 0, 0}, $x_4$={0, 0, 0, 0}, $x_5$={0, 0, 0, 0}, $x_6$={3}. After removal of groups of zeroes, the encoded data is x'={4, 0, 3, 0, 0, 1, 3, 5, 3}. The sparsity array is constructed as b={0, 1, 0, 1, 1, 1, 0} where a 1 value represents a group that contains only zeros and has been removed.

Sparse array encoding can also be applied at a higher level, for multiple-bit values rather than individual bits. In such cases, the "zeroes" threshold may be raised to some small value greater than zero when encoding an attribute with acceptable compression losses. For example, if it is known that an attribute comprises a noise level, then it is not necessary to encode the noise component, and a threshold may be set such that small noisy values are treated as equivalent to zeroes.

The above omission of noise is an example of quantization, in which a range of raw data values are all mapped to one quantized value. Other types of quantization may be applied as part of encoding. If quantization was used when encoding, then it is necessary to decide how to de-quantize when decoding the data. In some examples, it may be appropriate to de-quantize a quantized value to be the average of the range of raw data values which could have been mapped to the quantized value. In other cases, it may be appropriate to de-quantize the quantized value to be the lesser or upper bound of the range of possible raw data values.

As an addition or alternative to sparse array encoding, the encoded data or the sparsity array may be run-length encoded. In run-length encoding, sequences of 1s or zeroes are compressed and replaced with an indication of an original length of the compressed sequence. This further improves compression.

As a further addition or alternative, the encoded data may be entropy encoded. Entropy encoding may be applied to multiple parts of the compressed data, including the encoding type information, the ordering information, the encoded attribute values. Any type of Entropy encoding may be used, including Huffmann coding, range encoding, or a VC-6 type of encoding.

Figure 5:
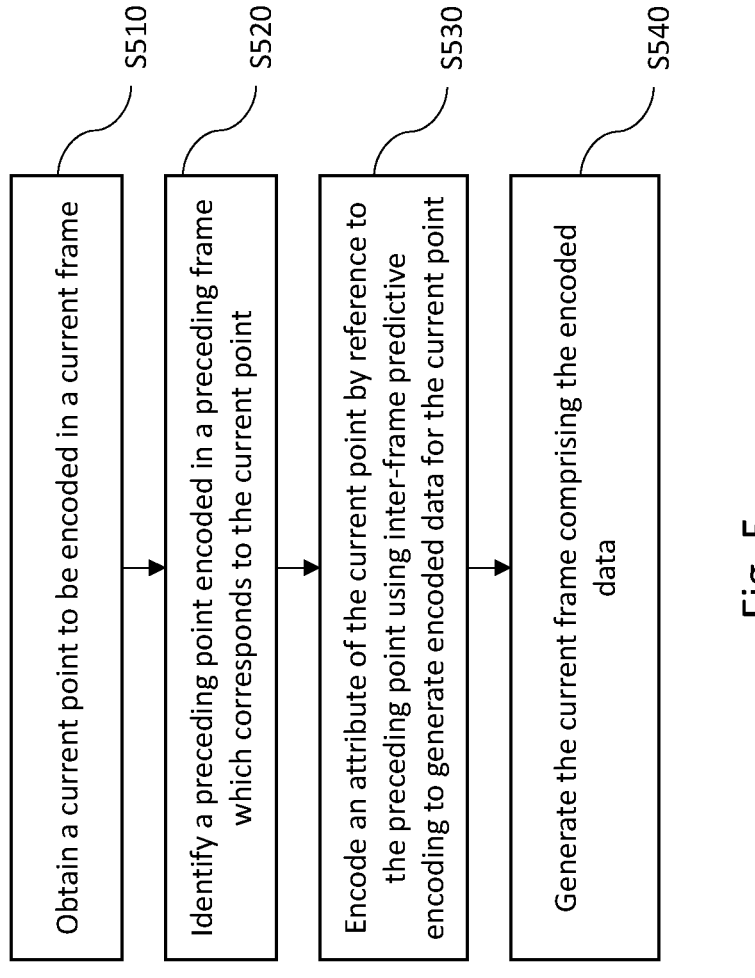
FIG. 5 is a flow chart schematically illustrating a method for encoding a frame of a sequence of frames of point cloud data.

FIG. 5 is a flow chart schematically illustrating a method for encoding a frame of a sequence of frames of point cloud data.

FIG. 5 particularly serves to highlight a principle of the invention which is distinct from prior art identified at the time of filing.

More specifically, at step S510, a current point is obtained which is to be encoded in a current frame. Referring back to the example of FIG. 1, the current point may for example be point 20-A of frame 10-2.

At step S520, a preceding point encoded in a preceding frame is identified, the preceding point corresponding to the current point to be encoded in the current frame. The preceding point may for example by point 20-A of frame 10-1.

At step S530, at least one attribute of the current point is encoded by reference to the preceding point using inter-frame predictive encoding to generate encoded data for the current point. For example, this may be a difference in colour between point 20-A of frame 10-2 and point 20-A of frame 10-1 (even if that difference is zero).

At step S540, an encoded current frame is generated comprising the encoded data for the current point.

In this technique, an attribute other than position is encoded for point cloud data using inter-frame prediction. This feature is not present in either of the papers GRAZIOSI and ROODAKI mentioned in the background section.

All of the techniques used by the encoder 220 are reversible (although not necessarily lossless). Thus the decoder 240 is essentially designed to perform the reverse of the techniques described above with respect to FIGS. 3 and 5. In particular, inter-frame and intra-frame predictive decoding work on essentially the same principle as inter-frame and inter-frame predictive encoding.

Figure 6:
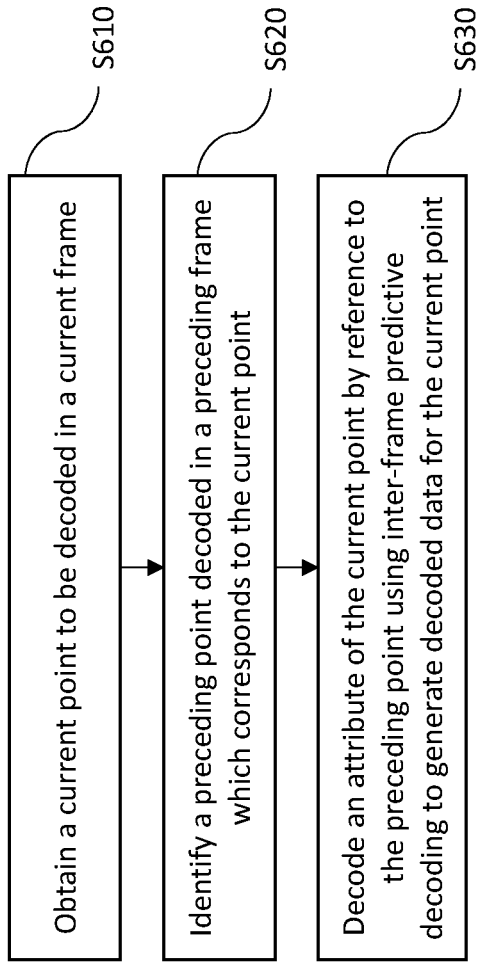
FIG. 6 is a flow chart schematically illustrating a method for decoding a frame of a sequence of frames of point cloud data.

FIG. 6 is a flow chart schematically illustrating key features of a method for decoding a frame of a sequence of frames of point cloud data. This method is performed on a sequence of encoded frames of point cloud data for rendering a dynamic 3D scene. Each frame comprises a plurality of encoded points, and each point comprises a 3D position and one or more attributes. The method may for example be performed by a decoder 240 in a system as illustrated in FIG. 2.

Referring to FIG. 6, at step S610, one point of the frame to be decoded is obtained as a current point.

At step S620, a preceding point decoded in a preceding frame is identified, wherein the preceding point corresponds to the current point.

At step S630, at least one attribute of the current point is decoded by reference to the preceding point using inter-frame prediction to generate decoded data for the current point.

This decoding method shares the special technical feature discussed above, that is, decoding an attribute other than position for point cloud data using inter-frame prediction.

Figure 7:
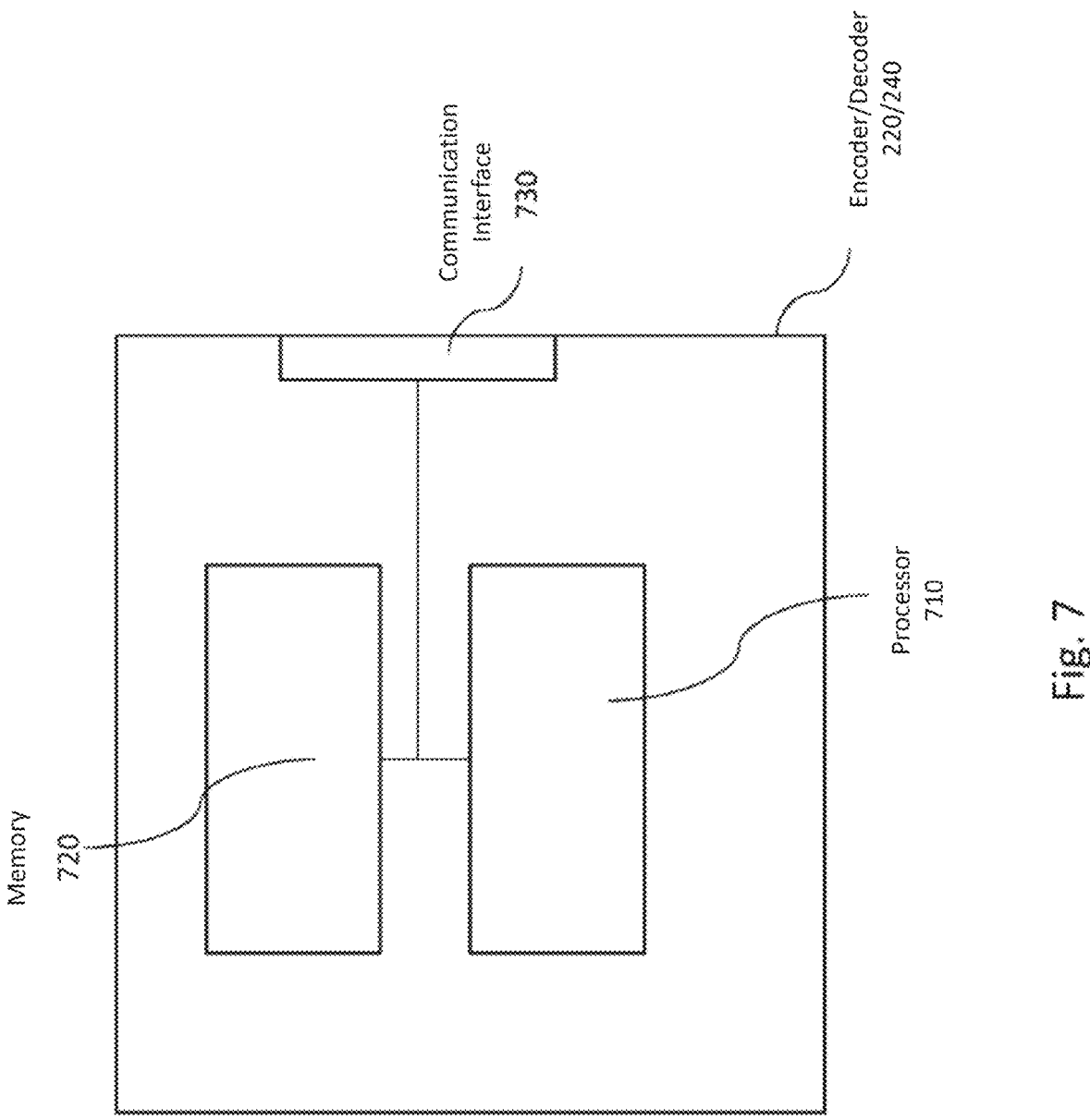
FIG. 7 is a schematic block diagram of an encoder or decoder.

FIG. 7 is a schematic block diagram of an encoder or decoder. As shown in FIG. 7, the encoder and decoder may be implemented by very general computer hardware including a processor 710 and a memory 720. The memory stores processor instructions, byte code, uncompiled code or any other form of computer instruction which can be converted to processor instructions in order to instruct the processor to perform a method as described above with respect to FIG. 5 or FIG. 6. Alternatively, the encoder or decoder could be entirely implemented as hardware configured to perform the method of FIG. 5 or FIG. 6 without requiring a general purpose processor or memory.

The encoder or decoder preferably also comprises a communication interface 730 to enable reception of unencoded point cloud data and transmission of encoded point cloud data, in the case of the encoder 220, and to enable reception of encoded point cloud data and enable transmission of unencoded point cloud data, in the case of the decoder 240.

The invention claimed is:

1. A method for encoding a frame of a sequence of frames of point cloud data for rendering a dynamic three-dimensional (3D) scene, wherein each frame comprises a plurality of points, and each point comprises a 3D position and one or more attributes, the method comprising:
identifying a current point included within a current frame, wherein the current frame is included among the sequence of frames of point cloud data;
identifying a preceding point included within a preceding frame, wherein the preceding frame is also included among the sequence of frames of point cloud data, and wherein the preceding point corresponds to the current point;
generating ordering information defining an order for a set of points included within the current frame, wherein the ordering information is configured to omit information relating to points that will be subsequently encoded using inter-frame predictive encoding, and wherein omitting the information is performed based on a determination that inter-frame predictively encoded points already have an order as defined in the preceding frame; and
encoding an attribute of the current point by reference to the preceding point using the inter-frame predictive encoding to generate encoded data for the current point.

2. The method according to claim 1, wherein the inter-frame predictive encoding of the attribute of the current point comprises encoding a difference between the attribute of the current point and a corresponding attribute of the preceding point.

3. The method according to claim 1, wherein identifying the preceding point, which corresponds to the current point, comprises identifying a particular point that has a same 3D position as the current point.

4. The method according to claim 3, wherein;
the one or more attributes of each point comprises a non-predicted attribute; and
identifying the preceding point comprises identifying a particular point that has a same 3D position as the current point and that has a same value of a corresponding non-predicted attribute as the current point.

5. The method according to claim 1, said method comprising:
determining that the inter-frame predictive encoding can be used for the current point, wherein said determining is based on a determination that the preceding point exists in the preceding frame.

6. The method according to claim 1, wherein the encoded data includes encoding type information indicating, for the current point, an encoding type, and wherein the encoding type indicates the inter-frame predictive encoding.

7. The method according to claim 1, wherein the ordering information also comprises a particular 3D position of the current point.

8. The method according to claim 7, wherein the ordering information comprises an octree based on the 3D position of the current point.

9. The method according to claim 8, wherein each leaf node of the octree comprises at least one 3D position of a point of the current frame.

10. The method according to claim 1, the method further comprising encoding a third point of the current frame using intra-frame predictive encoding.

11. The method according to claim 1, the method comprising:
encoding a second attribute of the current point.

12. The method according to claim 1, further comprising:
applying an entropy encoding method to at least one of: the ordering information, an encoding type information, or encoded values of a second attribute of the current point.

13. The method according to claim 12, wherein the entropy encoding method is a Huffman encoding, a range encoding, or a method according to a VC-6 standard.

14. A method for decoding a frame of a sequence of frames of point cloud data for rendering a dynamic three-dimensional (3D) scene, wherein each frame comprises a plurality of points, and each point comprises a 3D position and one or more attributes, the method comprising:
identifying a current point included within a current frame;
identifying a preceding point included within a preceding frame, wherein the preceding point corresponds to the current point;
obtaining ordering information defining an order for a set of points included within the current frame, wherein the ordering information is configured to omit information relating to points that were previously encoded using inter-frame predictive encoding, and wherein the omitted information was omitted based on a determination that inter-frame predictively encoded points already have an order as defined in the preceding frame; and
decoding an attribute of the current point by reference to the preceding point using inter-frame prediction decoding to generate decoded data for the current point.

15. The method according to claim 14, wherein the inter-frame prediction decoding comprises decoding a difference between the attribute of the current point and a corresponding attribute of the preceding point.

16. The method according to claim 14, wherein identifying the preceding point includes identifying a particular point that is decoded in the preceding frame and that has a same 3D position as the current point.

17. A computer system comprising:
one or more processors; and
one or more hardware storage devices that store instructions that are executable by the one or more processors to cause the computer system to:
access a sequence of frames that comprise point cloud data, wherein the sequence of frames includes a first frame and a second frame, wherein the first frame precedes the second frame within an ordering of the sequence of frames;
identify a first point included within the first frame;
identify a plurality of points included within the second frame, wherein the plurality of points includes a second point;
determine that the second point corresponds with the first point in that both the first point and the second point represent common data;
generating ordering information defining an order for the plurality of points included within the second frame, wherein the ordering information is configured to omit information relating to points that will be subsequently encoded using inter-frame predictive encoding, and wherein omitting the information is performed based on a determination that inter-frame predictively encoded points already have an order as defined in the first frame; and
use inter-frame predictive encoding to encode an attribute of the second point, wherein the inter-frame predictive encoding is performed for the second point by referencing the first point, and wherein encoding the attribute results in generation of encoded data for the second point.

18. The computer system of claim 17, wherein the inter-frame predictive encoding is performed only for points that are determined to be stationary as between the first frame and the second frame.

19. The computer system of claim 17, wherein using the inter-frame predictive encoding to encode the attribute of the second point is further based on a determination that the first point and the second point have all of the following in common:
a same three-dimensional (3D) position, and
at least one of: a same size or a same surface orientation.

20. The computer system of claim 19, wherein the first point and the second point have the same surface orientation.

* * * * *